United States Patent
Kharbutli et al.

(10) Patent No.: US 9,678,550 B2
(45) Date of Patent: Jun. 13, 2017

(54) DYNAMIC ROUTER POWER CONTROL IN MULTI-CORE PROCESSORS

(71) Applicant: EMPIRE TECHNOLOGY DEVELOPMENT LLC, Wilmington, DE (US)

(72) Inventors: Mazen Kharbutli, San Jose, CA (US); Yan Solihin, Raleigh, NC (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 225 days.

(21) Appl. No.: 14/337,748

(22) Filed: Jul. 22, 2014

(65) Prior Publication Data

US 2016/0026227 A1    Jan. 28, 2016

(51) Int. Cl.
G06F 1/26 (2006.01)
G06F 1/32 (2006.01)

(52) U.S. Cl.
CPC .............. *G06F 1/263* (2013.01); *G06F 1/324* (2013.01); *G06F 1/3206* (2013.01); *G06F 1/3296* (2013.01)

(58) Field of Classification Search
CPC ............................... G06F 1/263; G06F 1/3296
USPC ................................................ 713/300, 320
See application file for complete search history.

(56) References Cited

U.S. PATENT DOCUMENTS

| | | | | |
|---|---|---|---|---|
| 6,798,086 B2* | 9/2004 | Utsunomiya | ....... | H02M 3/1584 307/154 |
| 7,418,605 B1* | 8/2008 | To | ....... | H01L 23/5286 257/E23.153 |
| 8,874,940 B2* | 10/2014 | Fujita | ....... | G09G 3/3648 713/300 |
| 2006/0259800 A1* | 11/2006 | Maejima | ....... | G06F 1/3203 713/300 |
| 2008/0072085 A1* | 3/2008 | Horiguchi | ....... | G06F 1/3203 713/320 |
| 2012/0320771 A1* | 12/2012 | Chini | ....... | H04L 12/12 370/252 |
| 2014/0223214 A1* | 8/2014 | Nabhane | ....... | G05F 1/625 713/324 |

OTHER PUBLICATIONS

Beigné, E. et al., "An Asynchronous Power Aware and Adaptive NoC Based Circuit," IEEE Journal of Solid-State Circuits, Apr. 2009, pp. 1167-1177, vol. 44, No. 4.
Jerger, N. E. and Peh, L.-S., "On-Chip Networks" [Abstract], Synthesis Lectures on Computer Architecture, Morgan & Claypool Publishers, 2009, pp. 141.

(Continued)

*Primary Examiner* — Mark Connolly
(74) *Attorney, Agent, or Firm* — Moritt Hock & Hamroff LLP; Steven S. Rubin, Esq.

(57) ABSTRACT

Technologies are generally described for systems, devices, and methods effective to dynamically select at least one power supply rail for a router. In some examples, a power control unit may be configured to determine a buffer occupancy level of one or more buffers of the router. In some further examples, the buffer occupancy level may be compared to a threshold value. In various other examples, the at least one power supply rail of the router may be switched from a first power rail to a second power rail based on the results of the comparison.

18 Claims, 10 Drawing Sheets

(56) References Cited

OTHER PUBLICATIONS

Kulkarni, S. et al., "A New Algorithm for Improved VDD Assignment in Low Power Dual VDD Systems," in International Symposium on Low Power Electronics and Design, 2004, pp. 200-205.

Leverich, J. et al., "Power Management of Datacenter Workloads Using Per-core Power Gating," IEEE Computer Architecture Letters, Jul. 2009, pp. 48-51, vol. 8.

Miller, T. et al., "Booster: Reactive Core Acceleration for Mitigating the Effects of Process Variation and Application Imbalance in Low-voltage Chips," in International Symposium on High Performance Computer Architecture (HPCA), 2012, pp. 1-12.

Mishra, A. K. et al., "RAFT: A router architecture with frequency tuning for on-chip networks," J. Parallel Distrib. Comput., 2010, pp. 16.

Rosa, T. D. et al., "A Self-adaptable Distributed DFS Scheme for NoC-based MPSoCs," SBCCI'11, Aug. 30-Sep. 2, 2011, pp. 203-208.

\* cited by examiner

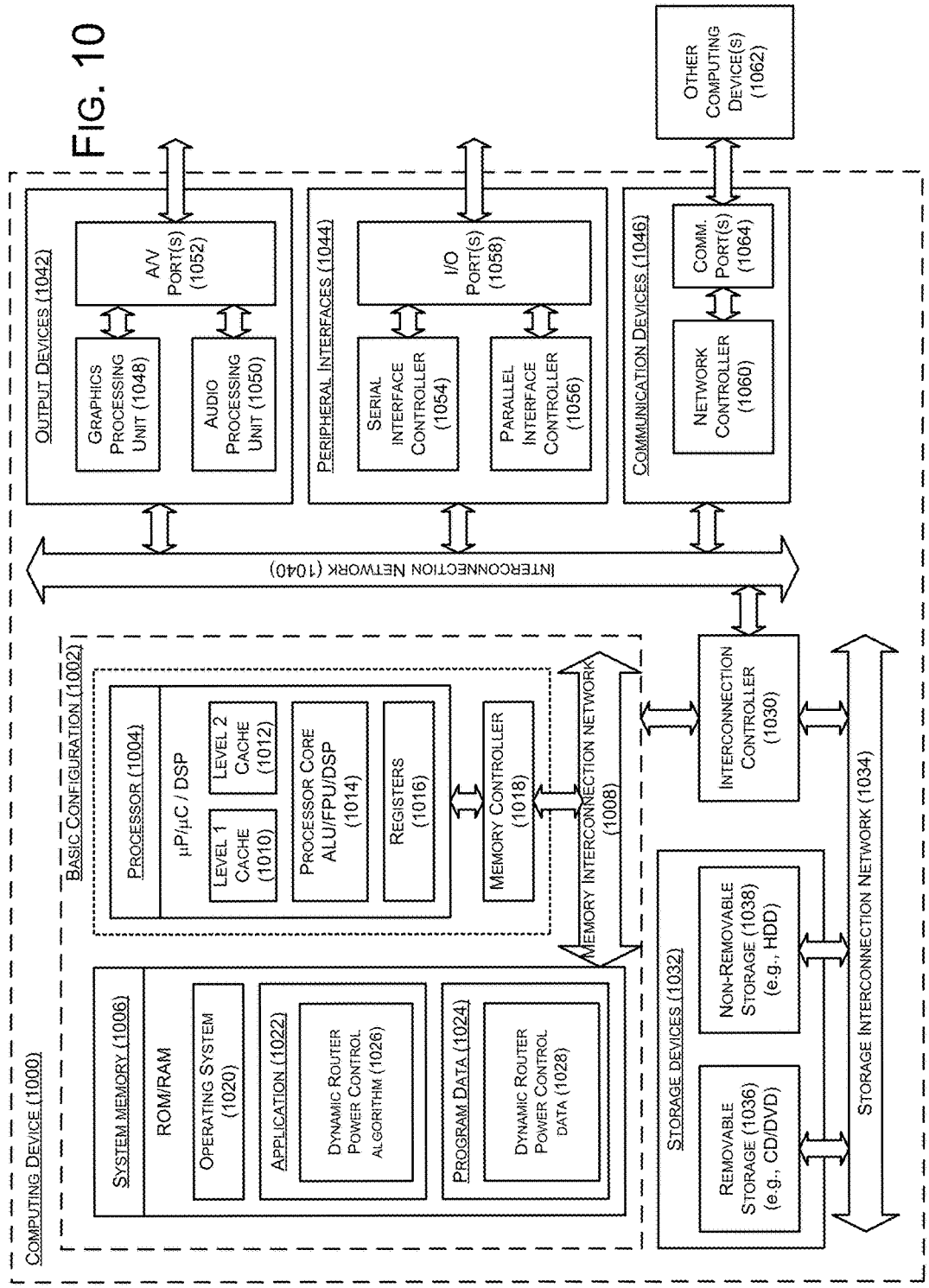

DYNAMIC ROUTER POWER CONTROL IN MULTI-CORE PROCESSORS

BACKGROUND

Unless otherwise indicated herein, the materials described in this section are not prior art to the claims in this application and are not admitted to be prior art by inclusion in this section.

In multi-core architectures, multiple processor cores may be included in a single integrated circuit die or on multiple integrated circuit dies that are arranged in a single package. One or more of the processor cores may be configured in communication with one another. Each of the processor cores may be associated with one or more routers. Each of the routers may include one or more input and/or output buffers configured to store data and configured to facilitate movement of data among processor cores in the multi-core processor.

SUMMARY

Methods for dynamically selecting at least one power supply rail for a router are generally described. Some example methods may include, by a power control unit, determining a buffer occupancy level of one or more buffers of the router. Various methods may further include comparing the buffer occupancy level of each of the one or more buffers to a threshold value. Some methods may further include switching the at least one power supply rail of the router from a first power rail to a second power rail based on the comparison.

In some examples, routers in multi-core processors are generally described. Each router may include at least one router power supply rail of the router. Each router may further include one or more buffers. Each router may further include a power control unit. In some examples, the power control unit may include a first port coupled to the router power supply rail and a second port coupled to the one or more buffers. In some further examples, the power control unit may include a third port coupled to logic circuitry. In some examples, the power control unit may be configured to communicate with the one or more buffers through the second port. In other examples, the power control unit may be configured to determine an occupancy level of the one or more buffers based on the communication. In some examples, the power control unit may be configured to output a control signal to the logic circuitry through the third port to selectively couple the router power supply rail to one of a first supply regulator and a second supply regulator based on the control signal.

In some examples, routers in multi-core processors are generally described. Each router may include at least one power supply rail of the router. Each router may further include a counter. Each router may further include one or more buffers. Each router may further include a power control unit arranged in cooperation with the counter. In some examples, the power control unit may include a first port coupled to the router power supply rail and a second port coupled to the one or more buffers. In some other examples, the power control unit may include a third port coupled to logic circuitry. In some further examples, the power control unit may be configured to communicate with the one or more buffers through the second port. In other examples, the power control unit may be configured to determine an occupancy level of the one or more buffers based on the communication. In some other examples, the power control unit may be further configured to increase a value of the counter when the occupancy level of one or more of the buffers is determined to be greater than or equal to a first threshold value. In some other examples, the power control unit may be further configured to decrease a value of the counter when the occupancy level of all of the one or more buffers is determined to be less than or equal to a second threshold value. In some other examples, the power control unit may be further configured to output a control signal to the logic circuitry through the third port. The logic circuit may be configured to selectively couple the router power supply rail to one of a first supply regulator and a second supply regulator based on the control signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 10 is a block diagram illustrating an example computing device that is arranged to implement dynamic router power control in multi-core processors; all arranged according to at least some embodiments described herein.

DETAILED DESCRIPTION

Figure 1:
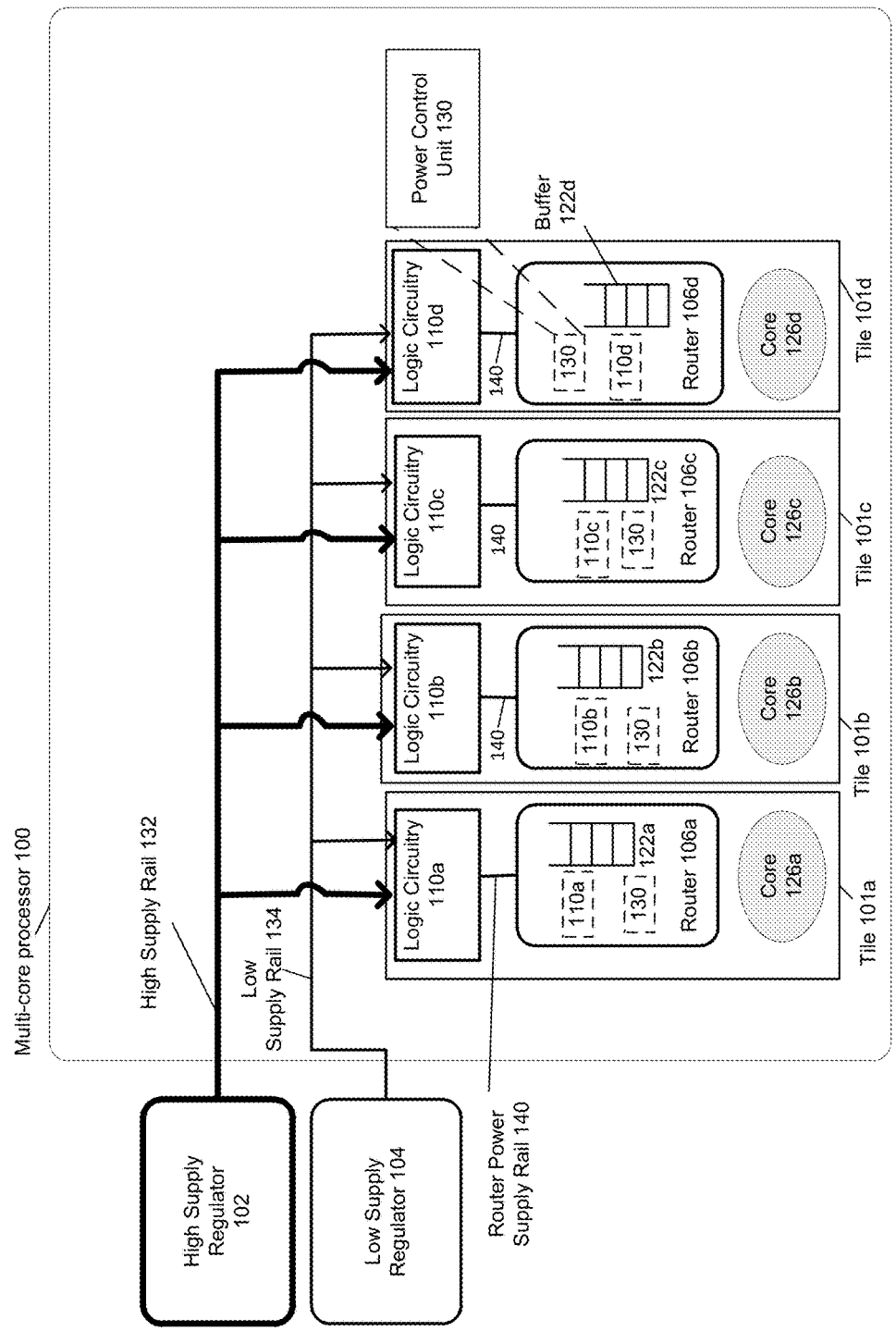
FIG. 1 illustrates an example system that can be utilized to implement dynamic router power control in multi-core processors.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the drawings, can be arranged, substituted, combined, separated, and designed in a wide variety of different configurations, all of which are explicitly contemplated herein.

This disclosure is generally drawn to, inter alia, methods, apparatus, systems, devices, and computer program products related to dynamic voltage control in multi-core processors.

Briefly stated, technologies are generally described for systems, devices, and methods effective to dynamically select at least one power supply rail for a router. In some examples, a power control unit may be configured to determine a buffer occupancy level of one or more buffers of the router. In some further examples, the buffer occupancy level may be compared to a threshold value. In various other examples, the at least one power supply rail of the router may be switched from a first power rail to a second power rail based on the comparison.

FIG. 1 illustrates an example system that can be utilized to implement dynamic voltage control in multi-core processors, arranged in accordance with at least some embodiments described herein. An example multi-core processor 100 may include one or more tiles 101 (including tiles 101a, 101b, 101c and 101d). Each of the tiles 101 may include one or more processor cores 126 (including cores 126a, 126b, 126c and 126d) and one or more routers 106 (including routers 106a, 106b, 106c and/or 106d). The various routers 106 may be configured to move data using one or more switching techniques; where the data may be moved as any desired data quantity such as any number or combination of bits, bytes, octets, nibbles, words, blocks, segments, pages, packets, parts of packets, flits, chunks, streams, etc.

Each of the routers 106 may include one or more buffers 122 (e.g., buffers 122a, 122b, 122c and/or 122d). Each of the buffers 122 may be configured to store one or more of incoming and/or outgoing data. Each of the tiles 101 and routers 106 may be configured in communication with each other via communication links such as data buses, or related elements configured to effectuate movement of data.

Each of the tiles 101 may include logic circuitry 110 (including logic circuitry 110a, 110b, 110c and/or 110d). The logic circuitry 110 may be included either in one or more of the routers 106 or outside one or more of the routers 106 in the corresponding one of the tiles 101. Each logic circuitry 110 may include one or more logic gates configured to couple power (e.g., voltage, current, etc.) supplied by one or more of a high supply rail 132 and/or a low supply rail 134. High supply rail 132 and low supply rail 134 may be links configured to supply power to each of routers 106. High supply rail 132 may be coupled to a high supply regulator 102. Low supply rail 134 may be coupled to a low supply regulator 104. High supply regulator 102 and low supply regulator 104 may be located on or off the chip of multi-core processor 100. High supply regulator 102 may be configured to supply power to one or more of routers 106. Low supply regulator 104 may also be configured to supply power to one or more of routers 106. In some examples, tiles 101 may include one or more intermediate supply rails configured to supply power to routers 106. An intermediate supply rail may be coupled to high supply regulator 102, low supply regulator 104 and/or another power supply regulator.

High supply regulator 102 may be configured to provide power to one or more power supply lines such as for a high supply power interconnection. The power provided by the high supply regulator 102 may be manifested as a voltage, a current, or a combination thereof. In cases where high supply regulator 102 is configured to provide a regulated voltage (e.g., $VDD_1 \ldots VDD_N$), the voltage produced may be relative to a supply ground (e.g., $GND_1$, 0V, −2V, +1V, etc.) or relative to another supply potential (e.g., $VEE_1 \ldots VEE_N$). High supply regulator 102 may further include facility for current limiting, voltage clamping, and/or other forms of short circuit and overload protection mechanisms. High supply regulator 102 may be a programmable and/or an adjustable regulator. In some examples, high supply regulator 102 may be a linear regulator, a non-linear regulator, a switching regulator, an LDO (low dropout) regulator, a band gap regulator, a single supply regulator, a dual supply regulator, a chopper regulator, a multiphase regulator, and/or a differential supply regulator.

Low supply regulator 104 may also be configured to provide power to one or more power supply lines such as for a low power supply interconnection. The power provided by the low supply regulator 104 may be manifested as a voltage, a current, or a combination thereof. In cases where low supply regulator 104 is configured to provide a regulated voltage (e.g., $VSS_1 \ldots VSS_M$), the voltage produced may be relative to a supply ground (e.g., $GND_2$, 0V, +2V, −3V, etc.) or relative to another supply potential (e.g., $VCC_1 \ldots VCC_M$). Low supply regulator 104 may further include facility for current limiting, voltage clamping, and/or other forms of short circuit and overload protection mechanisms. Low supply regulator 104 may be a programmable and/or adjustable regulator. In some examples, low supply regulator 104 may be a linear regulator, a non-linear regulator, a switching regulator, an LDO (low dropout) regulator, a band gap regulator, a single supply regulator, a dual supply regulator, and/or a differential supply regulator.

Each of the routers 106 may be selectively coupled to one of the high supply regulator(s) 102 or low supply regulator(s) 104. In some examples, the high supply regulator 102 is configured to provide a first power supply voltage that may be higher than a second power supply voltage that is provided by the low supply regulator 104. In another example, various routers 106 that are coupled to the high supply regulator 102 may be operable at a first clock frequency; while other routers 106 that are coupled to the low supply regulator 104 may be operable at a second clock frequency, where the first clock frequency may be higher than the second clock frequency. In an example, the first clock frequency may be 1 GHz, while the second clock frequency may be 400 MHz. Dynamic power consumption of the routers may be proportional to clock frequency. For example, operating routers 106 at higher clock frequencies may exhibit higher dynamic power consumption relative to other routers 106 that are operated at lower clock frequencies.

In examples with multiple routers 106, some routers may be coupled to high supply regulator 102 while other routers may be coupled to low supply regulator 104. In various other examples, any number of power supply regulators may be selectively coupled to router power supply rails 140 of various routers 106 of multicore processor 100. For example, an array of power supply regulators may be configured in communication with routers 106. Each power supply regulator may supply a particular power having characteristics that may be manifested as a current, a voltage, or a combination thereof.

Each of the routers 106 may include a corresponding power control unit 130. Power control unit 130 may be implemented as hardware and/or may be some combination of hardware and instructions executable by hardware. In some examples, power control unit 130 may be implemented in an application specific integrated circuit (ASIC) or in a field programmable gate array (FPGA). As will be discussed in further detail below, power control unit 130 may be configured to monitor routers 106 and operate logic circuitry 110. For example, power control unit 130 may be configured to operate logic circuitry 110 to selectively couple a router power supply rail 140 of a particular router 106 to high supply rail 132, low supply rail 134, and/or another power supply rail. Power control unit 130 may be configured to monitor the occupancy levels of buffers or routers 106. In some examples, power control unit 130 may be configured to monitor the occupancy levels continuously, periodically, in response to one or more interrupts, and/or upon detection of a change via some other mechanism. Power control unit 130 may be further configured to dynamically adapt the power to routers 106 when power control unit 130 determines that the occupancy level exceeds a threshold. Adjustment of the power to routers 106 may be effective to adapt one or more operational characteristics of routers 106. Operational characteristics may include, for example, an operating voltage, an operating current, and/or other operating characteristics of routers 106.

Figure 2:
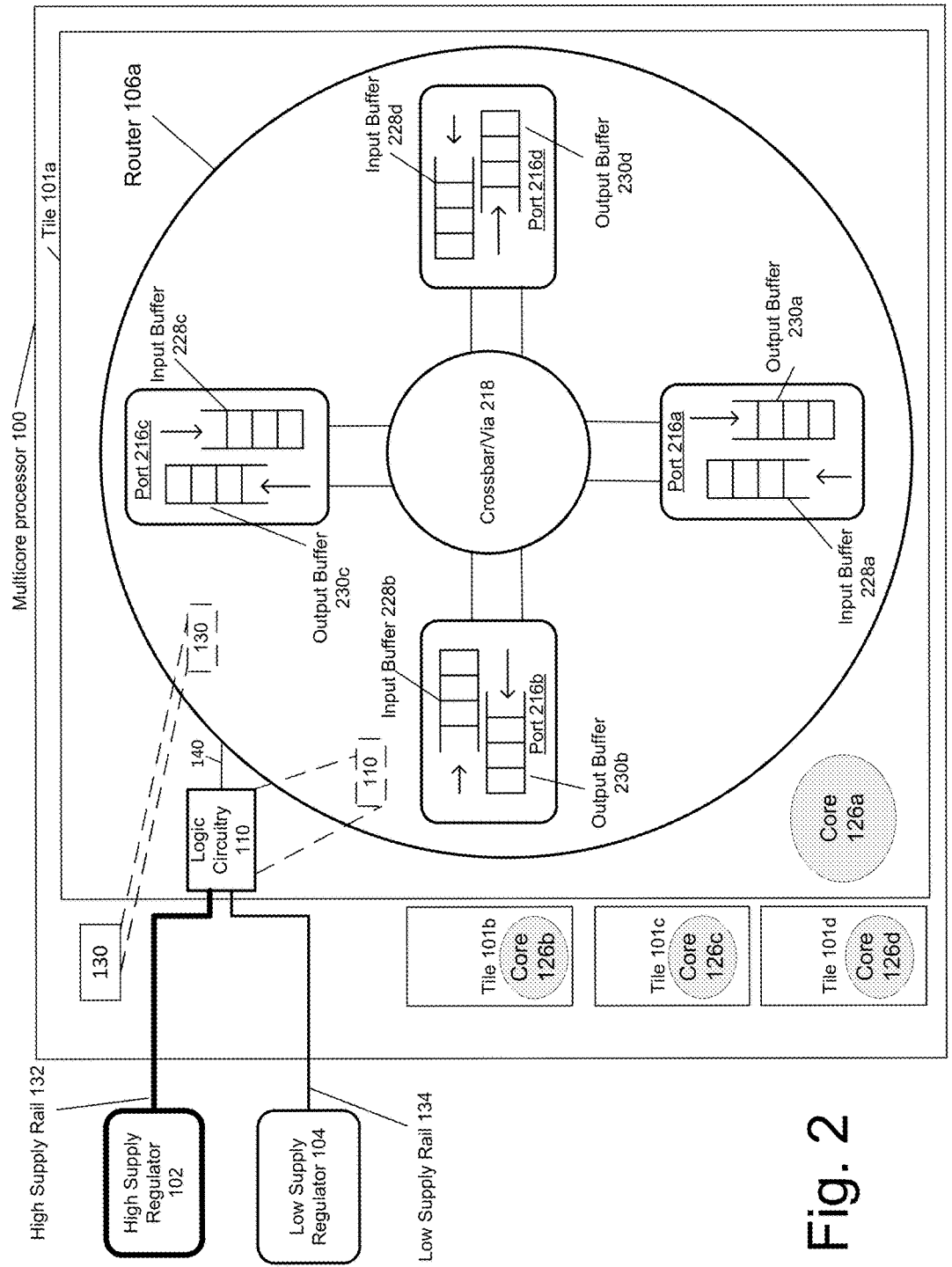
FIG. 2 depicts an example multi-core processor illustrating details relating to a router configured to implement dynamic router power control.

FIG. 2 depicts an example multi-core processor illustrating details relating to a router configured to implement dynamic router power control, arranged in accordance with at least some embodiments described herein. Those components in FIG. 2 that are labeled identically to components of FIG. 1 will not be described again for the purposes of clarity and brevity.

Focusing on router 106a as illustrative of other routers, router 106a may include one or more ports 216 (including ports 216a, 216b, 216c, and 216d). Ports 216 may be pathways configured to facilitate communication of data (e.g., input to, or output from) to router 106a. Ports 216 may include one or more input buffers 228 (e.g., input buffers 228a, 228b, 228c, and 228d) and/or output buffers 230 (e.g., output buffers 230a, 230b, 230c, and 230d). In some examples, each of the buffers 122 of FIG. 1 may include a corresponding one of the input buffers 228 and/or output buffers 230. Each of the input buffers 228 may be configured to store data received at a corresponding port 216. Each of the output buffers 230 may be configured to store data prior to transmission out of corresponding ports 216 of router 106a.

Power control unit 130 may be configured to determine an occupancy level of input buffers 228 and/or output buffers 230. An occupancy level may be determined, for example, by counting a number of flits, packets or other units of data stored in input buffers 228 and/or output buffers 230. In another example, an occupancy level may be determined by determining a rate of flits, packets, or other units of data coming into input buffers 228 and/or going out of output buffers 230. Power control unit 130 may be configured to selectively provide router 106a with access to high supply rail 132 or low supply rail 134 based on the occupancy level of input buffers 228 and/or output buffers 230. Power control unit 130 may be adapted to operate logic circuitry 110, which selectively couples router power supply rail 140 of router 106a to either high supply rail 132 or low supply rail 134. For example, power control unit 130 may be configured to operate logic circuitry 110 to selectively couple router power supply rail 140 to high supply rail 132 when the occupancy level of any buffer 228, 230 is determined to reach or exceed a first threshold (e.g., "$T_{high}$"). In another example, power control unit 130 may be configured to operate logic circuitry 110 to selectively couple router power supply rail 140 to low supply rail 134 when the occupancy level of all buffers 228, 230 are determined to be lower than or equal to a second threshold (e.g., "$T_{low}$"). As explained in more detail below, power control unit 130 may be adapted to control logic circuitry 110 effective to switch the coupling of router power supply rail 140 of router 106a from a first coupling to one of power rails (e.g., 132, 134), to a second coupling to the other of power rails (e.g., 132, 134), based on the occupancy level and one of the first and second thresholds.

High supply regulator 102 may be configured to supply power with a first voltage and/or a first current to router 106a. In an example, high supply regulator 102 may supply power with a voltage that is near the threshold voltage of one or more transistors in multi-core processor 100. High supply rail 132 may be utilized to supply the power from the high supply regulator 102 to router 106a via router power supply rail 140. Low supply regulator 104 may be configured to supply a power with a second voltage and/or current to router 106a. In an example, low supply regulator 104 may supply a power with a voltage that is near the threshold voltage of one or more transistors in multi-core processor 100. Low supply rail 134 may be utilized to supply the power from the low supply regulator 104 to router 106a via router power supply rail 140.

Figure 3:
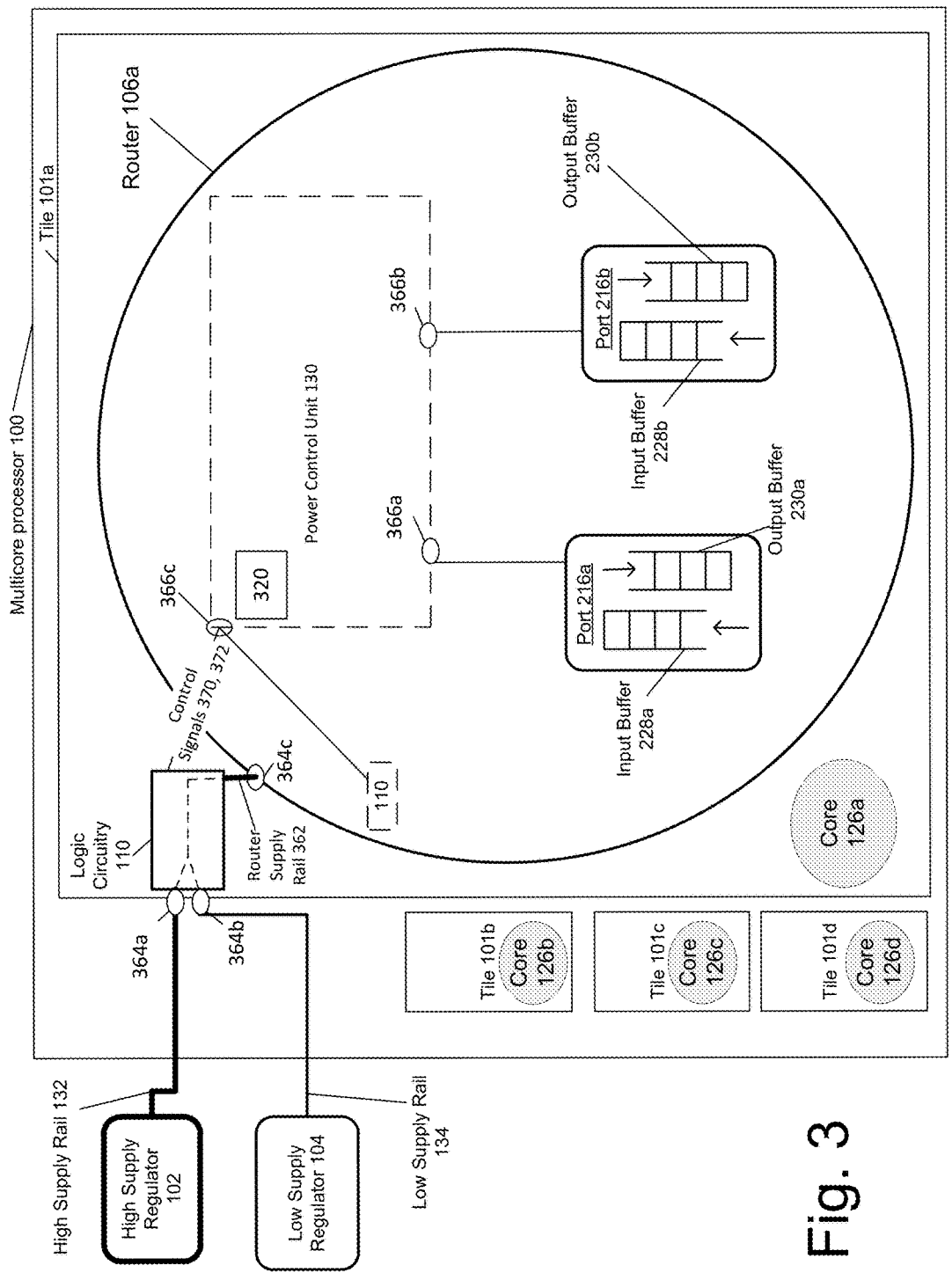
FIG. 3 depicts another example multi-core processor, illustrating details related to a power control unit.

FIG. 3 depicts another example multi-core processor illustrating details relating to a power control unit, arranged in accordance with at least some embodiments described herein. Those components in FIG. 3 that are labeled identically to components of FIGS. 1 and 2 will not be described again for the purposes of clarity and brevity.

Router supply rail 362 may be selectively coupled to high supply rail 132 and/or low supply rail 134 via one or more logic gates of logic circuitry 110. In some examples, high supply rail 132 and low supply rail 134 may be coupled to logic gates of logic circuitry 110 through ports 364a and 364b, respectively. Logic circuitry 110 may be configured to selectively couple high supply rail 132 or low supply rail 134 to a router supply rail 362 in response to a control signal 370 received from power control unit 130. In an example, router supply rail 362 may supply power to router 106a through port 364c. Logic circuitry 110 may be coupled to a power supply monitor 320. Power supply monitor 320 may be implemented as hardware and/or instructions executable by hardware. Power supply monitor 320 may be configured to monitor power supplied to router 106a. In some examples, power supply monitor 320 may be configured to determine a power rail to which router 106a may be dynamically coupled.

Power control unit 130 may be configured in communication with one or more buffers of router 106a via one or more input/output ports 366a, 366b of power control unit 130. Power control unit 130 may be configured to communicate one or more control signals (e.g., control signals 370, 372) to logic circuitry 110 through a port 366c. In response to the control signals (e.g., 370, 372), logic circuitry 110 may selectively operate one or more logic gates to dynamically couple router supply rail 362 to one or more power supply rails (e.g., high supply rail 132 and/or low supply rail 134).

In an example, power control unit 130 may be configured to communicate control signal 370 to logic circuitry 110 when the occupancy of one or more buffers of router 106a is determined to be equal to or greater than a high threshold value. In the example, logic circuitry 110 may couple high supply rail 132 to router supply rail 362 in response to control signal 370. Conversely, power control unit 130 may be configured to communicate control signal 372 to logic circuitry 110 when the occupancies of all buffers of router 106a are determined to be less than or equal to a low threshold value. Logic circuitry 110 may selectively couple low supply rail 134 to router supply rail 362 in response to control signal 372. As will be discussed further below, in some examples, a counter may be utilized to limit the frequency of oscillating between high supply rail 132 and low supply rail 134.

Figure 4:
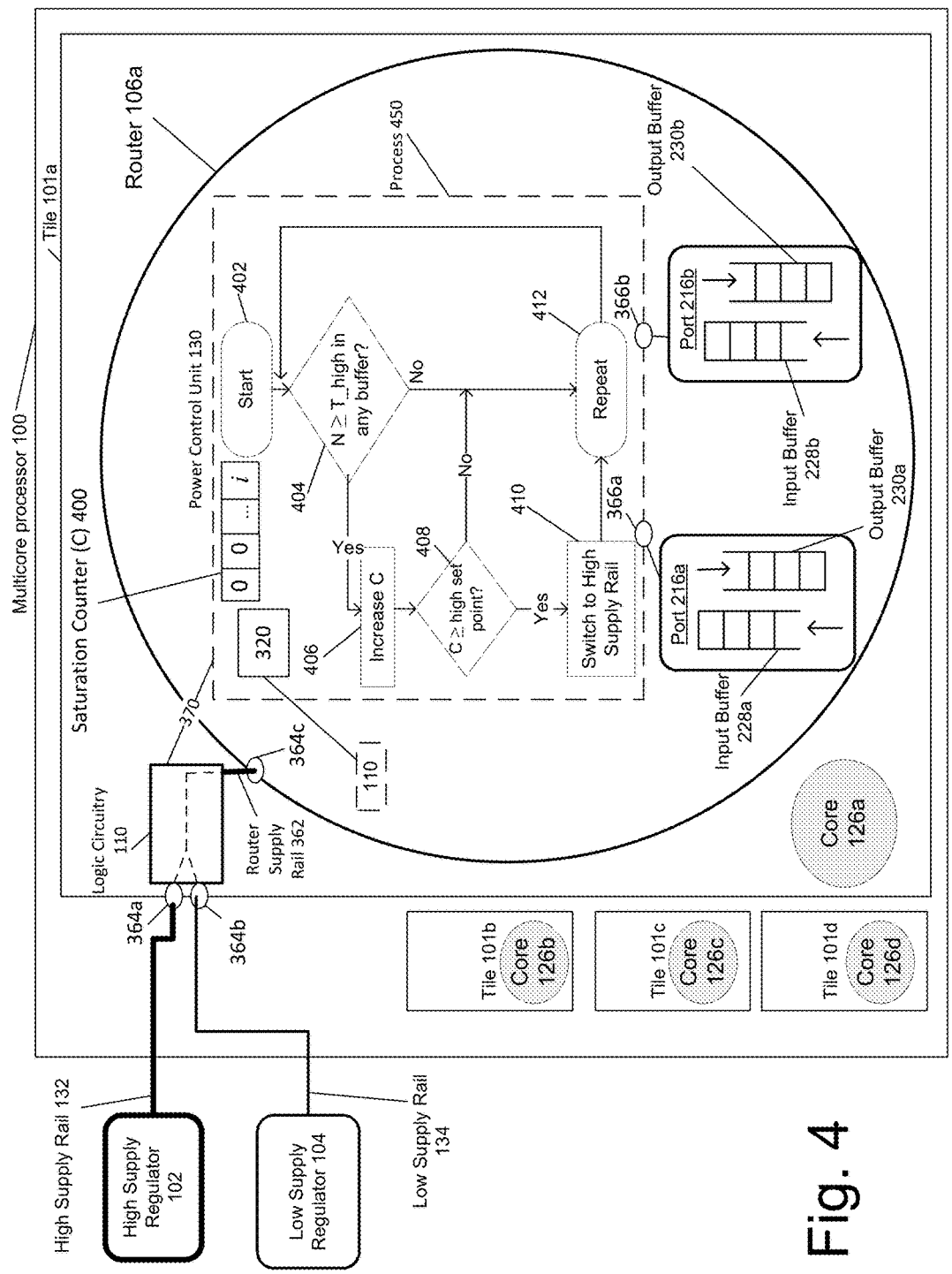
FIG. 4 depicts the example multi-core processor of FIG. 3, illustrating additional details related to the power control unit.

FIG. 4 depicts another example multi-core processor illustrating details relating to a power control unit, arranged in accordance with at least some embodiments described herein. Those components in FIG. 4 that are labeled identically to components of FIGS. 1, 2, and 3 will not be described again for the purposes of clarity and brevity.

Router supply rail 362 may be selectively coupled to high supply rail 132 and/or low supply rail 134 via one or more logic gates of logic circuitry 110. In some examples, high supply rail 132 and low supply rail 134 may be coupled to logic gates of logic circuitry 110 through ports 364a and 364b, respectively. Logic circuitry 110 may be configured to selectively couple high supply rail 132 or low supply rail 134 to a router supply rail 362 in response to a control signal 370 received from power control unit 130. In an example, router supply rail 362 may supply power to router 106a through port 364c. Logic circuitry 110 may be coupled to a power supply monitor 320. Power supply monitor 320 may be implemented as hardware and/or instructions executable on hardware. Power supply monitor 320 may be configured to monitor power supplied to router 106a. In some examples, power supply monitor 320 may be configured to determine a power rail to which router 106a may be coupled.

Power control unit 130 may be configured in communication with one or more buffers of router 106a via one or more input/output ports (e.g., ports 366a, 366b) of power control unit 130. Power control unit 130 may be configured to communicate control signal 370 to logic circuitry 110. In response to control signal 370, logic circuitry 110 may operate one or more logic gates to selectively couple router supply rail 362 to one or more power supply rails (e.g., high supply rail 132 and/or low supply rail 134) via one or more router supply rail ports 364.

Power control unit 130 may be configured to identify an existing connection or coupling between a power rail (including high supply rail 132 and low supply rail 134) and router 106a. Based on a determination that low supply rail 134 is coupled to router 106a, power control unit 130 may be configured to perform a process represented as example process 450 in FIG. 4.

Process 450 may be configured to monitor the buffer occupancy levels of buffers 228, 230. In one example, process 450 may be carried out periodically (e.g., according to a predetermined schedule such as once every 1000 clock cycles). Power control unit 130 may be configured to determine a number of units of data (e.g., units of data may be represented as bits, bytes, octets, nibbles, words, blocks, segments, pages, packets, parts of packets, flits, chunks, streams, etc.) stored in input buffers 228 and/or output buffers 230. The number of units of data stored in a buffer may be represented by the number "N." Power control unit 130 may determine a high threshold value ("T_high") for the number of units of data stored in buffers, where the buffers may include input buffers 228 and/or output buffers 230. In an example, if a determination is made that router 106a is coupled to low supply rail 134, high threshold value T_high may be selected, as T_high may be the corresponding threshold value to indicate that router 106a should be switched from a coupling to low supply rail 134 to high supply rail 132. In some examples, the value of T_high may be determined experimentally during the design phase of multicore processor 100. Values of T_high which yield performance and power savings above a threshold may be chosen.

Process 450 may include one or more blocks 402, 404, 406, 408, 410, and/or 412; which are intended to serve as an example process that may be utilized by power control unit 130. The function and/or operation of the various blocks may be combined into fewer blocks, divided into additional blocks or eliminated depending on the desired implementation. In some implementations, one or more of blocks 402, 404, 406, 408, 410 and/or 412 may be operated in serial, parallel, or a combination thereof.

The example process 450 may begin at block 402, "Start". Processing may proceed from block 402 to decision block 404, "N≥T_high in any buffer?" At decision block 404, power control unit 130 may be configured to compare the data occupancy level of one or more buffers to an occupancy threshold level. For example, power control unit 130 may be configured to determine whether the number N of units of data (e.g., bits, bytes, octets, nibbles, words, blocks, segments, pages, packets, parts of packets, flits, chunks, streams or other unit of data) stored in a buffer 228 or 230 is greater than or equal to the high threshold value, T_high. If the number N is determined to be greater than or equal to T_high, then processing may continue from decision block 404 to block 406, "Increase C". At block 406, the value of a saturation counter 400 may be increased. In some examples, the value of saturation counter 400 may be increased by 1 or by another value that may be an integer value or non-integer value (e.g., 0.5, 1.5, 2, 3, 5, etc.). For example, the integer or non-integer amount by which the value of saturation counter 400 may be increased may be stored as a fixed value in a register. In another example, the integer or non-integer amount by which the value of saturation counter 400 may be increased may be determined by dividing N by a constant. In other examples, the value of N may be shifted to produce integer or non-integer values. The amount by which the value of saturation counter 400 is increased may depend on the occupancy level of buffers of router 106a. Saturation counter 400 includes a counter value (e.g., either an integer or non-integer value) that represents an amount of time during which the occupancy level of buffers of router 106a has equaled or exceeded an occupancy threshold (e.g., T_high). In an example, saturation counter 400 may be implemented as a 2-bit counter that has a minimum value of "00" and a maximum value of "11." Power control unit 130 may be configured to decide whether to switch power rails based on counter values of saturation counter 400 and thereby limit the number of oscillations in the operating voltage/frequency/power of router 106a.

Block 406 may be followed by decision block 408, "C≥high set point?" At decision block 408, if the value of saturation counter 400 is determined to have a value (C) that is greater than or equal to a high set point counter value (e.g., max, where max=11 for a two bit counter), then processing may continue from decision block 408 to block 410, "Switch to High Supply Rail". At block 410, the power control unit 130 may communicate control signal 370 to logic circuitry 110. Logic circuitry 110 may dynamically switch the coupling of router supply rail 362 from low supply rail 134 to high supply rail 132 in response to control signal 370. High supply rail 132 may be configured to supply a higher power to router 106a relative to low supply rail 134. Block 410 may be followed by block 412, "Repeat." Processing may also continue from decision block 408 to block 412 when a value (C) of the saturation counter 400 is determined to be not greater than or equal to the high set point counter value (max). At block 412, the power control unit 130 may repeat or continue the process of monitoring occupancy levels of buffers from block 402.

Figure 5:
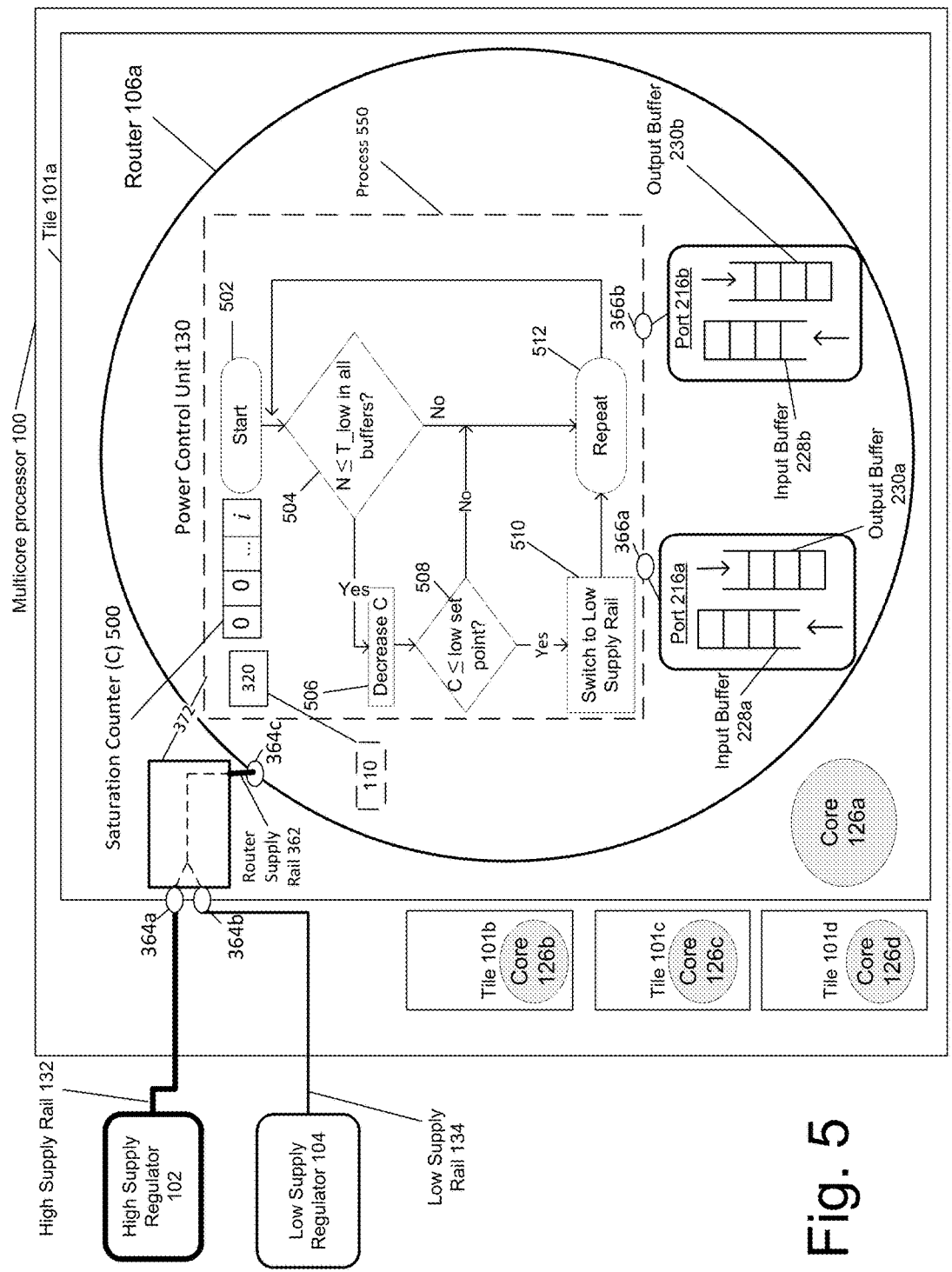
FIG. 5 depicts the example multi-core processor of FIG. 4 illustrating additional details related to a power control unit.

FIG. 5 depicts the example multi-core processor of FIG. 4 illustrating additional details related to a power control unit, arranged in accordance with at least some embodiments described herein. Those components in FIG. 5 that are labeled identically to components of FIGS. 1, 2, 3 and 4 will not be described again for the purposes of clarity and brevity.

Power control unit 130 may be configured to identify an existing coupling between a power rail (including high supply rail 132 and low supply rail 134) and router 106a. Based on a determination that high supply rail 132 is coupled to router 106a, power control unit 130 may be configured to perform a process represented as example process 550 in FIG. 5. Process 550 may be configured to monitor the buffer occupancy levels of buffers 228, 230. In one example, process 550 may be carried out periodically (e.g., once every 500 clock cycles). Power control unit 130 may be configured to determine a number of units of data (e.g., bits, bytes, octets, nibbles, words, blocks, segments, pages, packets, parts of packets, flits, chunks, streams, etc.) stored in input buffers 228 and/or output buffers 230. The number of units of data stored in a buffer may be represented by the number "N." Power control unit 130 may determine a low threshold value ("T_low") for the number of units of data stored in buffers, where the buffers may include input buffers 228 and output buffers 230. In an example, if a determination is made that router 106a is coupled to high supply rail 132, low threshold value T_low may be selected, as T_low may be the corresponding threshold value to indicate that router 106a should be switched from a coupling to high supply rail 132 to low supply rail 134. In some examples, the value of T_low may be determined experimentally during the design phase of multicore processor 100. Values of T_low which yield performance and power savings above a threshold may be chosen.

Process 550 may include one or more blocks 502, 504, 506, 508, 510, and/or 512; which are intended to serve as an example process that may be utilized by power control unit 130. The function and/or operation of the various blocks may be combined into fewer blocks, divided into additional blocks or eliminated depending on the desired implementation. In some implementations, one or more of blocks 502, 504, 506, 508, 510 and/or 512 may be operated in serial, parallel, or some combination thereof.

The example process 550 may begin at block 502, "Start". Processing may proceed from block 502 to block 504, "N≤T_low in all buffers?" At block 504, power control unit 130 may be configured to compare the data occupancy level of one or more buffers to an occupancy threshold level. For example, power control unit 130 may determine whether the number N of units of data (e.g., bits, bytes, octets, nibbles, words, blocks, segments, pages, packets, parts of packets, flits, chunks, streams or other units of data) stored in a buffer 228 or 230 is less than or equal to the low threshold value, T_low. In some example systems, the low threshold value T_low may be applied to a subset of buffers in a router. If the number N is less than or equal to T_low, then processing may continue from block 504 to block 506, "Decrease C." At block 506, the value of saturation counter 500 may be decreased. In some examples, the value of saturation counter 500 may be decreased by 1 or by another value that may be an integer value or non-integer value (e.g., 0.3, 1.5, 2, 3, 5.5, etc.). For example, the integer or non-integer amount by which the value of saturation counter 500 may be decreased may be stored as a fixed value in a register. In another example, the integer or non-integer amount by which the value of saturation counter 500 may be decreased may be determined by dividing N by a constant. In other examples, the value of N may be shifted to produce integer or non-integer values. The amount by which the value of saturation counter 500 is decreased may depend on the occupancy level of buffers of router 106a. Saturation counter 500 may include a counter value (e.g., an integer or non-integer value) that represents an amount of time during which the occupancy level of buffers of router 106a has been less than or equal to an occupancy threshold (e.g., T_low). In an example, saturation counter 500 may be implemented as a 2-bit counter that has a minimum value of "00" and a maximum value of "11." Saturation counter 500 may be used in conjunction with process 550 to reduce oscillations in the operating voltage/frequency/power of router 106a.

Block 506 may be followed by block 508, "C≤low set point?" At block 508, if saturation counter ("C") 500 is determined to have a value (C) that is less than or equal to a low set point counter value (e.g., min, where min=00 for a two bit counter), then processing may continue from block 508 to block 510, "Switch to Low Supply Rail". Power control unit 130 may be configured to operate logic circuitry 110 to switch the router from high supply rail 132 to low supply rail 134 at block 510. At block 510, the power control unit 130 may send control signal 372 to logic circuitry 110. Logic circuitry 110 may switch the coupling of router supply rail 362 from high supply rail 132 to low supply rail 134 in response to control signal 372. Low supply rail 134 may be configured to supply a lower power to router 106a relative to high supply rail 132. Block 510 may be followed by block 512, "Repeat." Processing may also continue from block 508 to block 512 when a value (C) of the saturation counter 500 is not less than or equal to the low set point counter value. At block 512, the power control unit 130 may repeat or continue the process of monitoring occupancy levels of buffers from block 502.

Among other benefits, a system in accordance with the present disclosure may be effective to reduce power consumption of an on-chip network in a multi-core processor without sacrificing throughput or efficiency. Power regulators may be on or off chip and may be configured to provide near threshold voltages to routers. Logic circuitry may be configured to control a coupling between a router and a higher power supply rail when a buffer of the router has an occupancy level above a high threshold value. Conversely, logic circuitry may be configured to control a coupling between a router and a lower power supply rail when each of the buffers of the router are determined to have an occupancy level below a low threshold value. Accordingly, the power consumption of the multi-core processor may be optimized based on buffer occupancy. A counter may be used to reduce the frequency of switching between the high and low power values, providing additional power savings.

Figure 6:
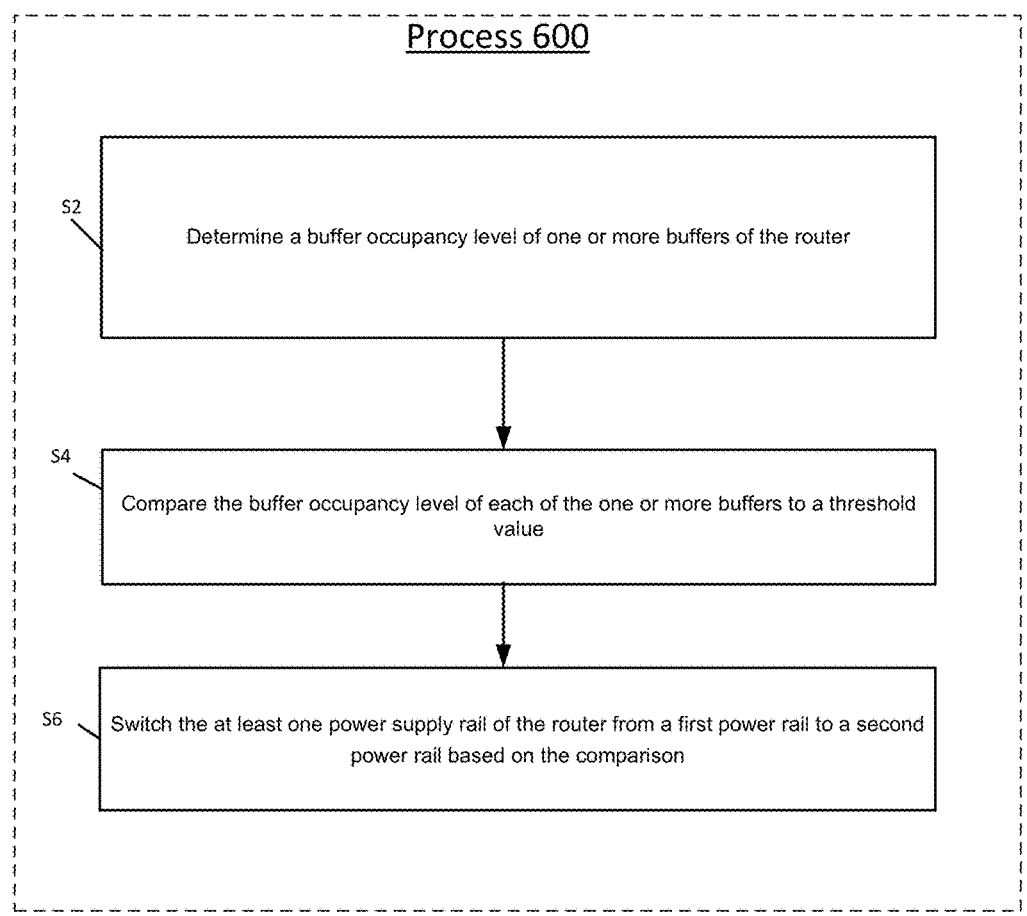
FIG. 6 depicts a flow diagram for an example process to implement dynamic router power control in multi-core processors.

FIG. 6 depicts a flow diagram for example process to implement dynamic router voltage control in multi-core processors, arranged in accordance with at least some embodiments described herein. In some examples, the process in FIG. 6 could be implemented using power control unit 130 discussed above and could be used to implement dynamic router voltage control. An example process 600 may include one or more operations, actions, or functions as illustrated by one or more of blocks S2, S4, and/or S6. Although illustrated as discrete blocks, various blocks may be divided into additional blocks, combined into fewer blocks, or eliminated, depending on the desired implementation. In some implementations, the blocks may be operated in parallel, serial or a combination thereof. The process in FIG. 6 may be used by a multi-core processor that includes one or more on-chip routers.

Processing for process 600 may begin at block S2, "Determine a buffer occupancy level of one or more buffers of the router." At block S2, a buffer occupancy level of one or more buffers of the router may be determined. For example, as illustrated by decision block 404, power control unit 130 may be configured to determine an occupancy level of one or more buffers (e.g., input buffers 228 and/or output buffers 230 of FIGS. 2-5) of router 106a.

Processing may continue from block S2 to block S4, "Compare the buffer occupancy level of each of the one or more buffers to a threshold value." At block S4, the buffer occupancy level of each buffer may be compared to a threshold value (e.g., T_high and/or T_low from FIGS. 4 and 5) such as by power control unit 130. Prior to comparing, a determination may be made that the router is coupled to a first power rail. For example, a determination may be made that the router is coupled to high supply rail 132 or low supply rail 134 of FIGS. 1-5. The threshold value may be adjusted based on the determination that the at least one power supply rail of the router is coupled to the first power rail. Comparing the buffer occupancy level to the threshold value may further comprise determining whether a value of a counter is greater than or equal to a high set point counter value or whether the value of the counter is less than or equal to a low set point counter value.

Comparing the buffer occupancy level to a threshold value may include decreasing a counter value (e.g., a value of saturation counter 400, 500) when the occupancy level of each of the one or more buffers is determined to be less than or equal to the threshold value. For example, with reference to FIG. 5, a value of a 2 bit saturation counter may be decreased from "11" to "10" when the occupancy level of each of the buffers 228, 230 is determined to be less than or equal to the threshold value T_low. In another example, with reference to FIG. 5, a value of a saturation counter may be decreased from 1.6 to 1.2 when the occupancy of each of the buffers 228, 230 is determined to be less than or equal to the threshold value T_low.

Alternatively, comparing the buffer occupancy level to a threshold value may include increasing a counter when the occupancy level of any of the one or more buffers is greater than or equal to the threshold value. For example, with reference to FIG. 4, a value of a 3 bit saturation counter may be increased from "010" to "011" when the occupancy level of any of buffers 228, 230 is greater than or equal to the threshold value T_high. In another example, with reference to FIG. 4, a value of a saturation counter may be increased from 5.3 to 6.7 when the occupancy level of any of buffers 228, 230 is greater than or equal to the threshold value T_high.

Processing may continue from block S4 to block S6, "Switch the at least one power supply rail of the router from a first power rail to a second power rail based on the comparison." At block S6, the at least one power supply rail of the router may be switched, such as by power control unit 130 and logic circuitry 110, from a first power rail to a second power rail based on the results of the comparison. Switching may be further based on the determination that a counter is greater than or equal to the high set point counter value. Additionally, the first power rail may be configured to supply a first voltage; while the second power rail may be configured to supply a second voltage, where the first voltage may have a value that is lower than that of the second voltage. Alternatively, switching may be further based on the determination that the counter is less than or equal to a low set point counter value, where the first voltage may be higher than the second voltage. Logic circuitry may be configured to control a selective coupling of the router to the first power rail or the second power rail.

Processes 450 and/or 550 from FIGS. 4 and 5 may be generally implemented in a similar fashion to process 600 as described below. For example, block S4 of process 600 may be similar to actions, operations and/or functions described previously with references to decision block 404 of FIG. 4. Similarly, block S4 of process 600 may be similar to actions, operations or functions described previously with reference to decision block 504 of FIG. 5. In a further example, block S2 of process 600 may be similar to actions, operations and/or functions described previously with references to decision block 404 of FIG. 4 and decision block 504 of FIG. 5. In another example, block S6 of process 600 may be similar to actions, operations and/or functions described previously with references to block 410 of FIG. 4 and block 510 of FIG. 5.

Figure 7:
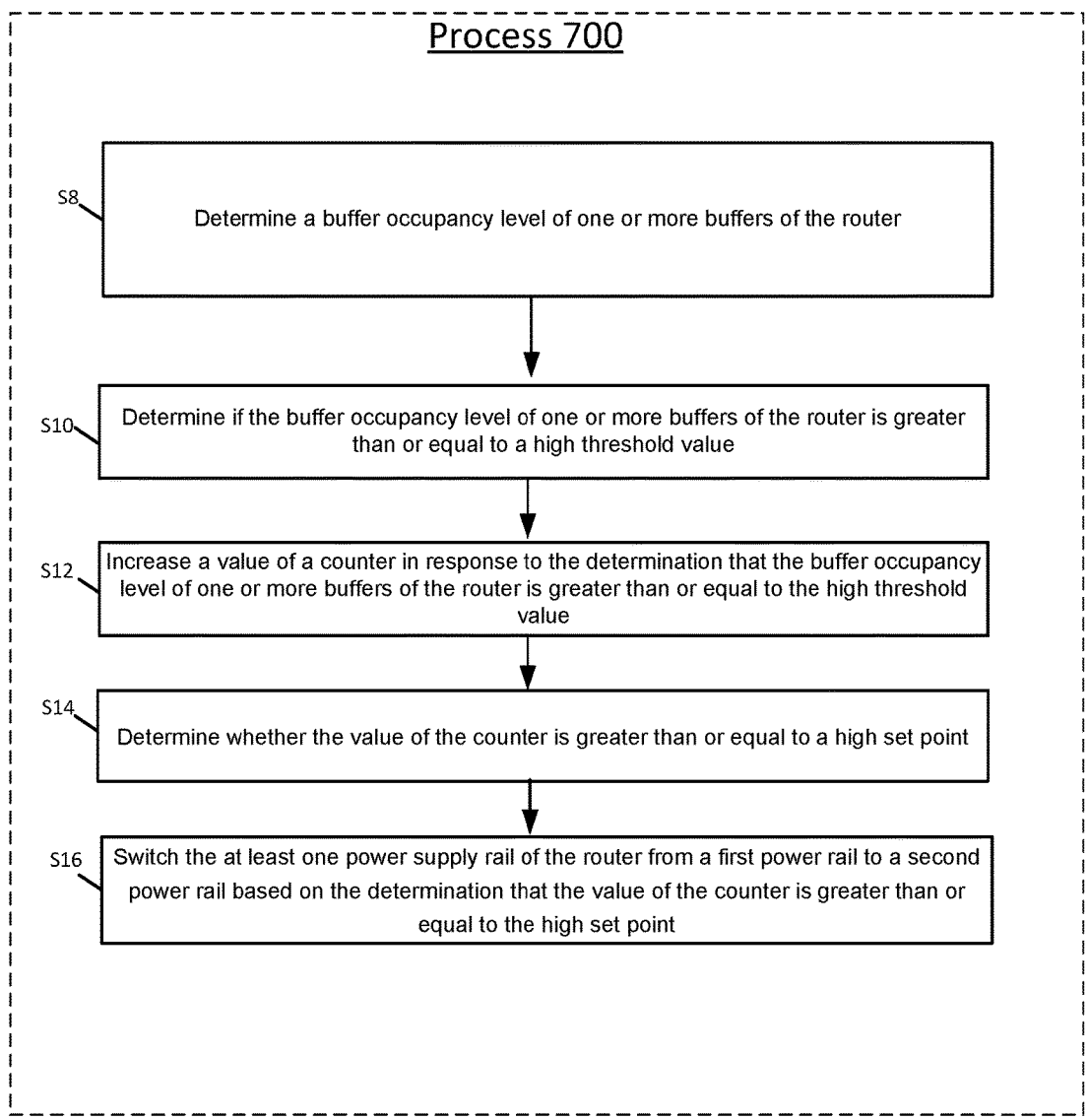
FIG. 7 depicts another flow diagram for an example process to implement dynamic router power control in multi-core processors.

FIG. 7 depicts a flow diagram for example process to implement dynamic router voltage control in multi-core processors, arranged in accordance with at least some embodiments described herein. In some examples, the process in FIG. 7 may be implemented using power control unit 130 discussed above and may be used to implement dynamic router voltage control. An example process 700 may include one or more operations, actions, or functions as illustrated by one or more of blocks S8, S10, S12, S14 and/or S16. Although illustrated as discrete blocks, various blocks may be divided into additional blocks, combined into fewer blocks, or eliminated, depending on the desired implementation. In some implementations, the blocks may be operated in parallel, serial or a combination thereof. The process in FIG. 7 may be used by a multi-core processor that includes one or more on-chip routers.

Processing for process 700 may begin at block S8, "Determine a buffer occupancy level of one or more buffers of the router." At block S8, a buffer occupancy level of one or more buffers of the router may be determined. Block S8 may be similar to decision block 404 of process 450 described previously with reference to FIG. 4. For example, at decision block 404 of FIG. 4, power control unit 130 may determine an occupancy level of one or more buffers (e.g., input buffers 228 and/or output buffers 230) of router 106a.

Processing may continue from block S8 to block S10, "Determine if the buffer occupancy level of one or more buffers of the router is greater than or equal to a high threshold value." At block S10, a determination may be made whether the buffer occupancy level of one or more buffers of the router is greater than or equal to a high threshold value. Block S10 may be similar to decision block 404 of process 450 described previously with reference to FIG. 4. For example, at block 404 of FIG. 4, power control unit 130 may determine if the buffer occupancy level of one or more buffers of the router is greater than or equal to a high threshold value "T_high."

Process 700 may continue from block S10 to block S12, "Increase a value of a counter in response to the determination that the buffer occupancy level of one or more buffers of the router is greater than or equal to the high threshold value." At block S12, a value of the counter may be increased in response to the determination that the buffer occupancy level of one or more buffers of the router is greater than or equal to the high threshold value. Block S12 may be similar to block 406 of process 450 described previously with reference to FIG. 4. For example, in FIG. 4 at block 406, a value of a counter "C" may be increased in response to the determination that the buffer occupancy level of one or more buffers of the router is greater than or equal to the high threshold value "T_high."

Process 700 may continue from block S12 to block S14, "Determine whether the value of the counter is greater than or equal to a high set point." At block S14, a determination may be made whether the value of the counter is greater than or equal to a high set point. Block S14 may be similar to decision block 408 of process 450 described previously with reference to FIG. 4. For example, in FIG. 4 at decision block 408, a determination may be made whether or not the value of the counter "C" is greater than or equal to "high set point."

Process 700 may continue from block S14 to block S16, "Switch the at least one power supply rail of the router from a first power rail to a second power rail based on the determination that the value of the counter is greater than or equal to the high set point." At block S16, the at least one power supply rail of the router may be switched from a first power rail to a second power rail based on the determination that the value of the counter is greater than or equal to the high set point. Block S16 may be similar to block 410 of process 450 described previously with reference to FIG. 4. For example, at block 410 of FIG. 4, router supply rail 362 may be switched from a coupling to low supply rail 134 to high supply rail 132 based on the determination that the value of the counter C is greater than or equal to "high set point."

Figure 8:
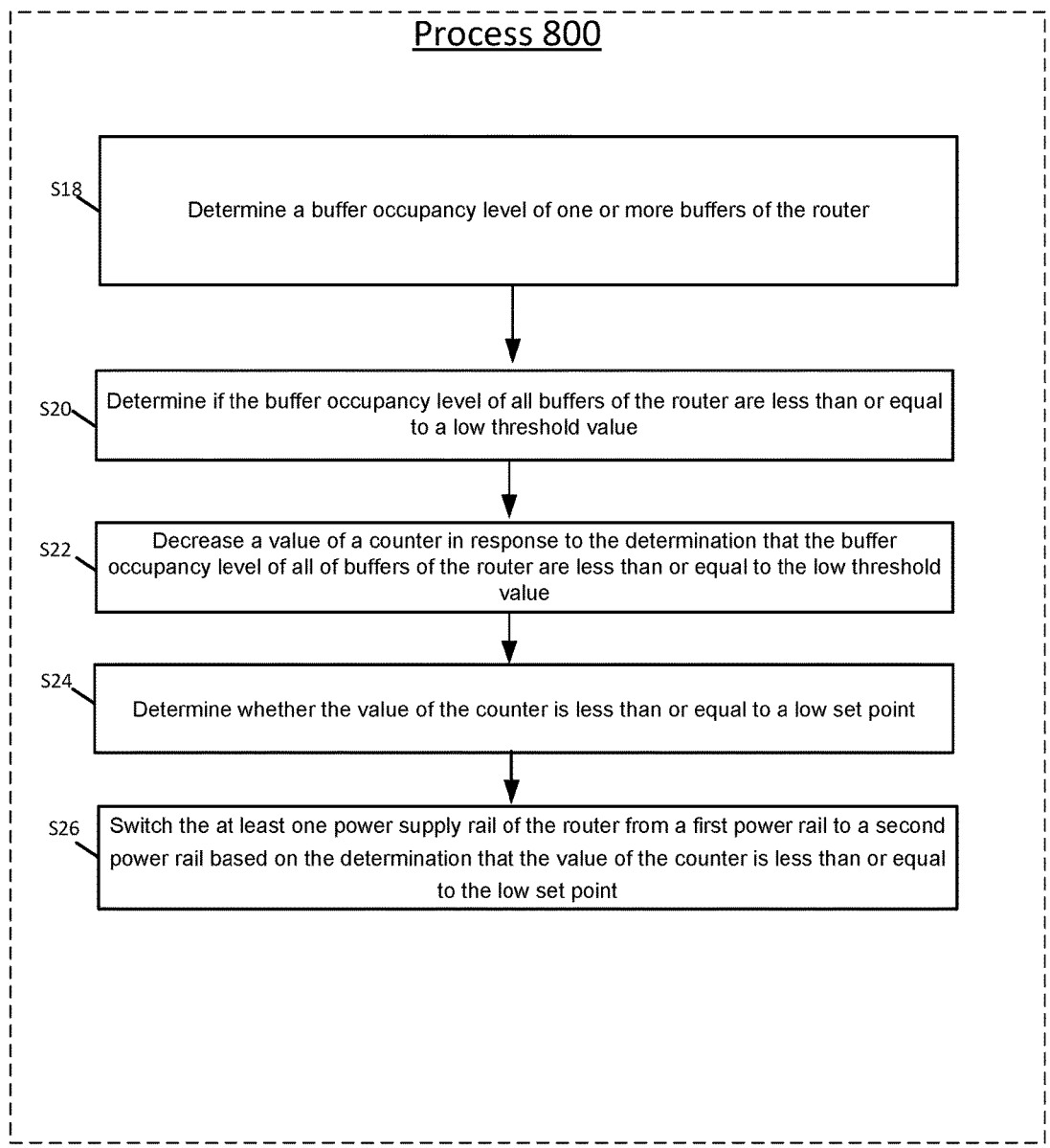
FIG. 8 depicts another flow diagram for another example process to implement dynamic router power control in multi-core processors.

FIG. 8 depicts a flow diagram for example process to implement dynamic router voltage control in multi-core processors, arranged in accordance with at least some embodiments described herein. In some examples, the process in FIG. 8 could be implemented using power control unit 130 discussed above and could be used to implement dynamic router voltage control. An example process 800 may include one or more operations, actions, or functions as illustrated by one or more of blocks S18, S20, S22, S24 and/or S26. Although illustrated as discrete blocks, various blocks may be divided into additional blocks, combined into fewer blocks, or eliminated, depending on the desired implementation. In some implementations, the blocks may be operated in parallel, serial or a combination thereof. The process in FIG. 8 may be used by a multi-core processor that includes one or more on-chip routers.

Processing for process 800 may begin at block S18, "Determine a buffer occupancy level of one or more buffers of the router." At block S18, a buffer occupancy level of one or more buffers of the router may be determined. Block S18 may be similar to block 504 of process 550 described previously with reference to FIG. 5. For example, at block 504 of FIG. 5, power control unit 130 may determine an occupancy level of one or more buffers (e.g., input buffers 228 and/or output buffers 230) of router 106a.

Processing may continue from block S18 to block S20, "Determine if the buffer occupancy level of each of the buffers of the router are determined to be less than or equal to a low threshold value." At block S20, a determination may be made whether the buffer occupancy level of each of the buffers of the router are determined to be less than or equal to a low threshold value. Block S20 may be similar to block 504 of process 550 described previously with reference to FIG. 5. For example, at block 504 of FIG. 5, power control unit 130 may determine whether the buffer occupancy level of input buffers 228 and output buffers 230 are less than or equal to a low threshold value "T_low."

Process 800 may continue from block S20 to block S22, "Decrease a value of a counter in response to the determination that the buffer occupancy level of each of the buffers of the router are determined to be less than or equal to the low threshold value." At block S22, a value of a counter may be decreased in response to the determination that the buffer occupancy level of each of the buffers of the router are determined to be less than or equal to the low threshold value. Block S22 may be similar to block 506 of process 550 described previously with reference to FIG. 5. For example, at block 506 of FIG. 5, power control unit 130 may decrease a value of a counter "C" in response to the determination that the buffer occupancy level of each of the buffers of router 106a are determined to be less than or equal to the low threshold value "T_low."

Process 800 may continue from block S22 to block S24, "Determine whether the value of the counter is less than or equal to a low set point." At block S24, a determination may be made whether the value of the counter is less than or equal to a low set point. Block S24 may be similar to block 508 of process 550 described previously with reference to FIG. 5. For example, at block 508 of FIG. 5, power control unit 130 may determine whether the counter "C" is less than or equal to the low set point "low set point."

Process 800 may continue from block S24 to block S26, "Switch the at least one power supply rail of the router from a first power rail to a second power rail based on the determination that the value of the counter is less than or equal to the low set point." At block S26, the at least one power supply rail of the router may be switched from a first power rail to a second power rail based on the determination that the value of the counter is less than or equal to the low set point. Block S26 may be similar to block 510 of process 550 described previously with reference to FIG. 5. For example, at block 510 of FIG. 5, router supply rail 362 may be switched from a coupling to high supply rail 132 to low supply rail 134 based on the determination that the value of the counter C is less than or equal to "low set point."

Figure 9:
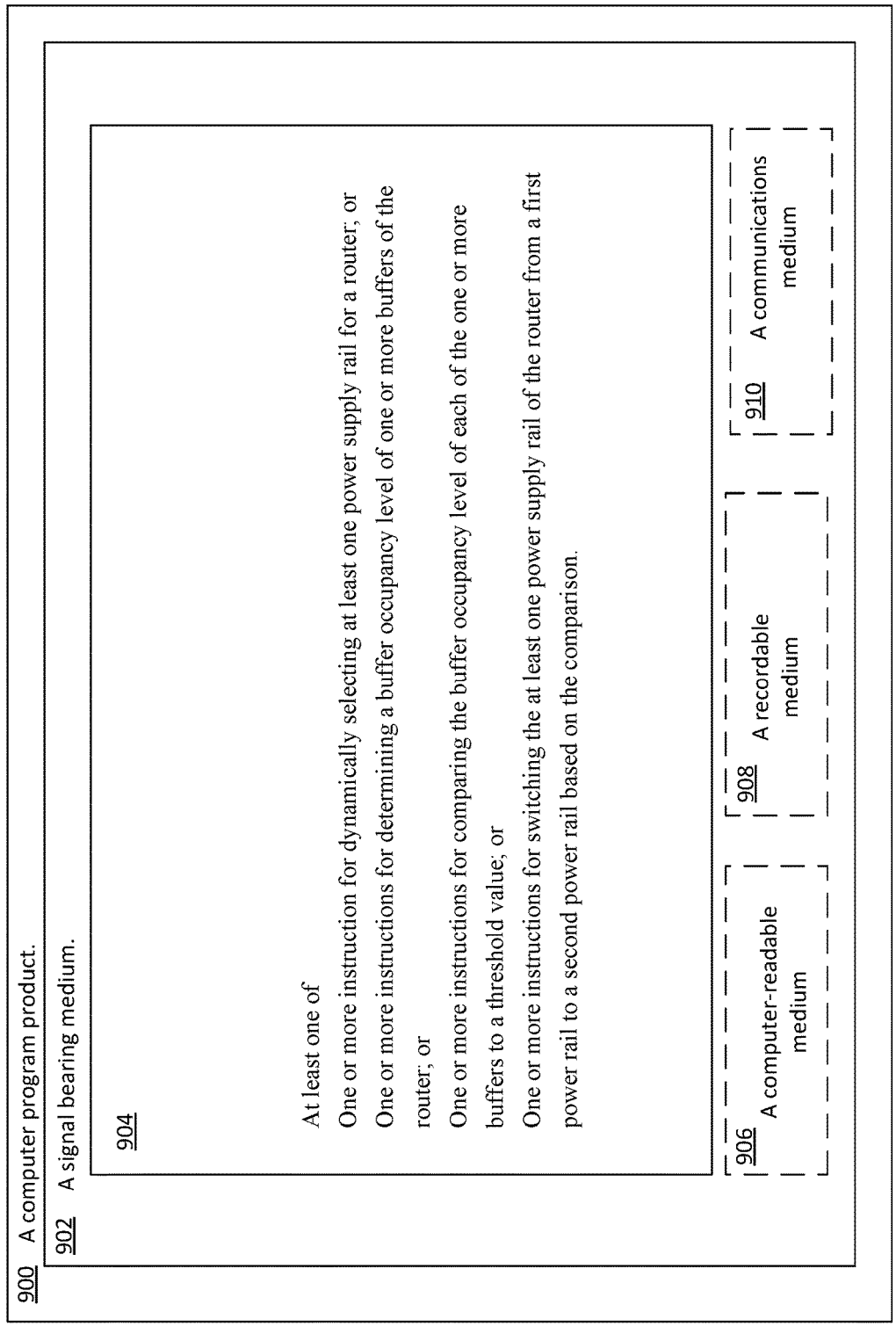
FIG. 9 illustrates an example computer program product that can be utilized to implement dynamic router power control in multi-core processors.

FIG. 9 illustrates an example computer program product 900 that can be utilized to implement dynamic router power control in multi-core processors, arranged in accordance with at least some embodiments described herein. Computer program product 900 may include a signal bearing medium 902. Signal bearing medium 902 may include one or more instructions 904 that, when executed by, for example, a processor, may provide the functionality described above with respect to FIGS. 1-8. Thus, for example, referring to multi-core processor 100, power control unit 130 may be configured to undertake one or more actions in response to execution of instructions 904 conveyed to power control unit 130 by signal bearing medium 902.

In some implementations, signal bearing medium 902 may encompass a computer-readable medium 906, such as, but not limited to, a hard disk drive (HDD), a Compact Disc (CD), a Digital Video Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communication link, a wireless communication link, etc.). Thus, for example, computer program product 900 may be conveyed to one or more modules of the multi-core processor 100 by an RF signal bearing medium 902, where the signal bearing medium 902 is conveyed by a wireless communications medium 910 (e.g., a wireless communications medium conforming with the IEEE 802.11 standard).

FIG. 10 is a block diagram illustrating an example computing device 1000 that is arranged to implement dynamic router power control in multi-core processors, arranged in accordance with at least some embodiments described herein. In a very basic configuration 1002, computing device 1000 typically includes one or more processors 1004 and a system memory 1006. A memory interconnection network 1008 may be used for communicating between processor 1004 and system memory 1006.

Depending on the desired configuration, processor 1004 may be of any type including but not limited to a microprocessor (µP), a microcontroller (µC), a digital signal processor (DSP), or any combination thereof. Processor 1004 may include one or more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Application 1022 may include a dynamic router power control algorithm 1026 that is arranged to perform the operations, functions or actions as described herein including those described with respect to multi-core processor 100 of FIGS. 1-9. Program data 1024 may include dynamic router power control data 1028 that may be useful to implement dynamic router power control in multi-core processors as is described herein. In some embodiments, application 1022 may be arranged to operate with program data 1024 on operating system 1020 such that dynamic router power control in multi-core processors may be provided. This described basic configuration 1002 is illustrated in FIG. 10 by those components within the inner dashed line.

Computing device 1000 may have additional features or functionality, and additional interfaces to facilitate communications between basic configuration 1002 and any required devices and interfaces. For example, an interconnection controller 1030 may be used to facilitate communications between basic configuration 1002 and one or more data storage devices 1032 via a storage interconnection network 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interconnection network 1040 for facilitating communication from various interface devices (e.g., output devices 1042, peripheral interfaces 1044, and communication devices 1046) to basic configuration 1002 via interconnection controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to dynamically select at least one power supply rail for a router, the method comprising, by a power control unit:
   determining a buffer occupancy level of one or more buffers of the router;
   determining that the at least one power supply rail for the router is coupled to a first power rail;
   adjusting a threshold value based on the determination that the at least one power supply rail for the router is coupled to the first power rail;
   comparing the buffer occupancy level of each of the one or more buffers to the threshold value; and
   switching the at least one power supply rail for the router from the first power rail to a second power rail based on the comparison.

2. The method of claim 1, wherein:
   the first power rail is configured to provide a first voltage,
   the second power rail is configured to provide a second voltage, and
   a value of the first voltage is lower than a value of the second voltage.

3. The method of claim 1, wherein:
   the first power rail is configured to provide a first voltage,
   the second power rail is configured to provide a second voltage, and
   a value of the first voltage is higher than a value of the second voltage.

4. The method of claim 1, wherein determining the buffer occupancy level comprises determining a number of bits, bytes, octets, nibbles, words, blocks, segments, pages, packets, parts of packets, flits, chunks, or streams stored in the one or more buffers of the router.

5. A method to dynamically select at least one power supply rail for a router, the method comprising, by a power control unit:
    determining a buffer occupancy level of one or more buffers of the router;
    comparing the buffer occupancy level of each of the one or more buffers to a threshold value, wherein comparing the buffer occupancy level to the threshold value comprises increasing a value of a counter when the buffer occupancy level of any of the one or more buffers is determined to be greater than or equal to the threshold value; and
    switching the at least one power supply rail for the router from a first power rail to a second power rail based on the comparison.

6. The method of claim 5, wherein comparing the buffer occupancy level to the threshold value comprises:
    determining whether the value of the counter is greater than or equal to a high set point counter value.

7. A method to dynamically select at least one power supply rail for a router, the method comprising, by a power control unit:
    determining a buffer occupancy level of one or more buffers of the router;
    comparing the buffer occupancy level of each of the one or more buffers to a threshold value, wherein comparing the buffer occupancy level to the threshold value comprises decreasing a value of a counter when the buffer occupancy level of each of the one or more buffers is determined to be less than or equal to the threshold value; and
    switching the at least one power supply rail for the router from a first power rail to a second power rail based on the comparison.

8. The method of claim 7, wherein comparing the buffer occupancy level to the threshold value further comprises:
    determining whether the value of the counter is less than or equal to a low set point counter value.

9. A router in a multi-core processor, the router comprising:
    at least one router power supply rail;
    one or more buffers; and
    a power control unit that includes a first port coupled to the at least one router power supply rail, a second port coupled to the one or more buffers, and a third port coupled to logic circuitry, wherein the power control unit is configured to:
        communicate with the one or more buffers through the second port;
        determine an occupancy level of the one or more buffers based on the communication;
        based on the occupancy level of the one or more buffers, output a control signal to the logic circuitry through the third port, wherein the logic circuitry is configured to selectively couple the at least one router power supply rail to one of a first supply regulator and a second supply regulator based on the control signal;
        determine whether the at least one router power supply rail is coupled to the first supply regulator; and
        in response to the determination that the at least one router power supply rail is coupled to the first supply regulator, adjust a threshold value of buffer occupancy.

10. The router of claim 9, further comprising a counter, wherein the counter is arranged in cooperation with the power control unit, such that a value of the counter is increased when the power control unit determines that the occupancy level of the one or more buffers is greater than or equal to the threshold value.

11. The router of claim 10, wherein the power control unit is further configured to:
    determine whether the value of the counter is greater than or equal to a high set point counter value; and
    couple the at least one router power supply rail to the second supply regulator, in response to the determination that the value of the counter is greater than or equal to the high set point counter value.

12. The router of claim 9, wherein the first supply regulator is configured to supply a first voltage when coupled to the at least one router power supply rail, the second supply regulator is configured to supply a second voltage when coupled to the at least one router power supply rail, and wherein a value of the first voltage is lower than a value of the second voltage.

13. The router of claim 9, further comprising a counter, wherein the counter is arranged in cooperation with the power control unit, such that a value of the counter is decreased when the power control unit determines that the occupancy level of each of the one or more buffers is less than or equal to the threshold value.

14. The router of claim 13, wherein the power control unit is further configured to:
    determine whether the value of the counter is less than or equal to a low set point counter value; and
    couple the at least one router power supply rail to the second supply regulator, in response to the determination that the value of the counter is less than or equal to the low set point counter value.

15. The router of claim 9, wherein:
    the first supply regulator is configured to supply a first voltage when coupled to the at least one router power supply rail through the first port,
    the second supply regulator is configured to supply a second voltage when coupled to the at least one router power supply rail through the first port, and
    a value of the first voltage is higher than a value of the second voltage.

16. A router in a multi-core processor, the router comprising:
    at least one router power supply rail;
    a counter;
    one or more buffers; and
    a power control unit arranged in cooperation with the counter and that includes a first port coupled to the at least one router power supply rail, a second port coupled to the one or more buffers, and a third port coupled to logic circuitry, wherein the power control unit is configured to:
        communicate with the one or more buffers through the second port;
        determine an occupancy level of the one or more buffers based on the communication;
        increase a value of the counter, in response to a determination that the occupancy level of each of the one or more buffers is greater than or equal to a first threshold value;
        decrease the value of the counter, in response to a determination that the occupancy level of each of the one or more buffers is less than or equal to a second threshold value; and
        output a control signal to the logic circuitry through the third port, wherein the logic circuitry is configured to selectively couple the at least one router power supply rail to one of a first supply regulator and a second supply regulator based on the control signal.

17. The router of claim 16, wherein:
the first supply regulator is configured to supply a first voltage,
the second supply regulator is configured to supply a second voltage, and
a value of the first voltage is lower than a value of the second voltage.

18. The router of claim 16, wherein:
the first supply regulator, when coupled to the at least one router power supply rail, is effective to operate the router at a first clock frequency;
the second supply regulator, when coupled to the at least one router power supply rail, is effective to operate the router at a second clock frequency; and
the first clock frequency is higher than the second clock frequency.

* * * * *